US010796030B2

(12) United States Patent
Albertson et al.

(10) Patent No.: US 10,796,030 B2
(45) Date of Patent: Oct. 6, 2020

(54) DETECTING AN ATTEMPTED THEFT OF INFORMATION STORED IN AN RFID-ENABLED CARD

(71) Applicant: International Business Machines Corporation, Armonk, NY (US)

(72) Inventors: Chad M. Albertson, Rochester, MN (US); Eric J. Campbell, Rochester, MN (US); Nicholas J. Ollerich, Rochester, MN (US); Christopher W. Steffen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 15/335,562

(22) Filed: Oct. 27, 2016

(65) Prior Publication Data

US 2018/0121686 A1 May 3, 2018

(51) Int. Cl.
| | |
|---|---|
| *G06F 21/88* | (2013.01) |
| *G06F 21/78* | (2013.01) |
| *G06F 21/62* | (2013.01) |
| *G06K 19/073* | (2006.01) |
| *G06K 19/00* | (2006.01) |

(52) U.S. Cl.
CPC .......... *G06F 21/88* (2013.01); *G06F 21/6209* (2013.01); *G06F 21/78* (2013.01); *G06K 19/07327* (2013.01); *G06K 19/005* (2013.01)

(58) Field of Classification Search
CPC ...... G06F 21/88; G06F 21/6209; G06F 21/78; G06K 19/0723; G06K 19/07749; G06K 19/07327; G06K 19/005; H04L 63/1491
See application file for complete search history.

(56) References Cited

U.S. PATENT DOCUMENTS

| | | | | |
|---|---|---|---|---|
| 7,598,875 | B2 | 10/2009 | Noguchi | |
| 9,747,539 | B1* | 8/2017 | Kendall | ........... G06K 19/07381 |
| 2006/0293027 | A1* | 12/2006 | Hammad | ......... G06K 19/07309 |
| | | | | 455/410 |
| 2007/0250920 | A1* | 10/2007 | Lindsay | .................. G06F 21/31 |
| | | | | 726/7 |
| 2008/0303638 | A1* | 12/2008 | Nguyen | .............. G06F 19/3462 |
| | | | | 340/10.42 |

(Continued)

FOREIGN PATENT DOCUMENTS

| | | |
|---|---|---|
| GB | 2498970 A | 8/2013 |
| GB | 2528316 A | 1/2016 |

*Primary Examiner* — Linglan E Edwards
*Assistant Examiner* — Forrest L Carey
(74) *Attorney, Agent, or Firm* — Nathan M. Rau

(57) ABSTRACT

Detecting an attempted theft of information stored in an RFID-enabled card, including: receiving, by a theft detection module, a transaction request, the transaction request including RFID-enabled card information; determining, by the theft detection module, that the RFID-enabled card information is mock card information, wherein mock card information is provided to an RFID reader by an RFID tag exterior to an RFID shield of an RFID-enabled card security enclosure responsive to an RFID request directed at the security enclosure; and responsive to determining that the RFID-enabled card information is mock card information, initiating, by the theft detection module, one or more security actions.

18 Claims, 6 Drawing Sheets

(56) References Cited

U.S. PATENT DOCUMENTS

2010/0194567 A1\* 8/2010 Jung .................. G06F 21/88
340/568.1
2015/0077229 A1\* 3/2015 Augustinowicz ..........................
G06K 19/07327
340/10.1

\* cited by examiner

DETECTING AN ATTEMPTED THEFT OF INFORMATION STORED IN AN RFID-ENABLED CARD

BACKGROUND

Field of the Invention

The field of the invention is data processing, or, more specifically, methods, apparatus, and products for detecting an attempted theft of information stored in an RFID-enabled card.

Description of Related Art

Today, cards of various types include Radio Frequency Identification ('RFID') tags. Examples of such cards may include credit cards or other contactless payment cards, security cards for granting access to physical locations, retail loyalty cards, and the like. The rise of use in such RFID embedded credit cards has resulted in an increase of identity fraud caused from victims' having their RFID chips read by criminals with RFID readers. To counteract these attacks RFID shielding wallets have been developed. While the shielding wallets provide protection from theft, there is no method to identify the individual attempting the theft.

SUMMARY

Methods, apparatus, and products for detecting an attempted theft of information stored in a Radio Frequency Identification ('RFID')-enabled card are disclosed in this specification. Such detection of an attempted theft includes: receiving, by a theft detection module, a transaction request, the transaction request including RFID-enabled card information; determining, by the theft detection module, that the RFID-enabled card information is mock card information, wherein mock card information is provided to an RFID reader by an RFID tag exterior to an RFID shield of an RFID-enabled card security enclosure responsive to an RFID request directed at the security enclosure; and responsive to determining that the RFID-enabled card information is mock card information, initiating, by the theft detection module, one or more security actions.

Also disclosed in this specification are security enclosures for RFID-enabled cards. Such a security enclosure includes: an RFID shield, the RFID shield configured to block RFID transmissions from an exterior of the RFID shield into an interior space formed by the RFID shield, the interior space configured to store one or more RFID-enabled cards; and an RFID tag located exterior to the RFID shield, the RFID tag including mock card information.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
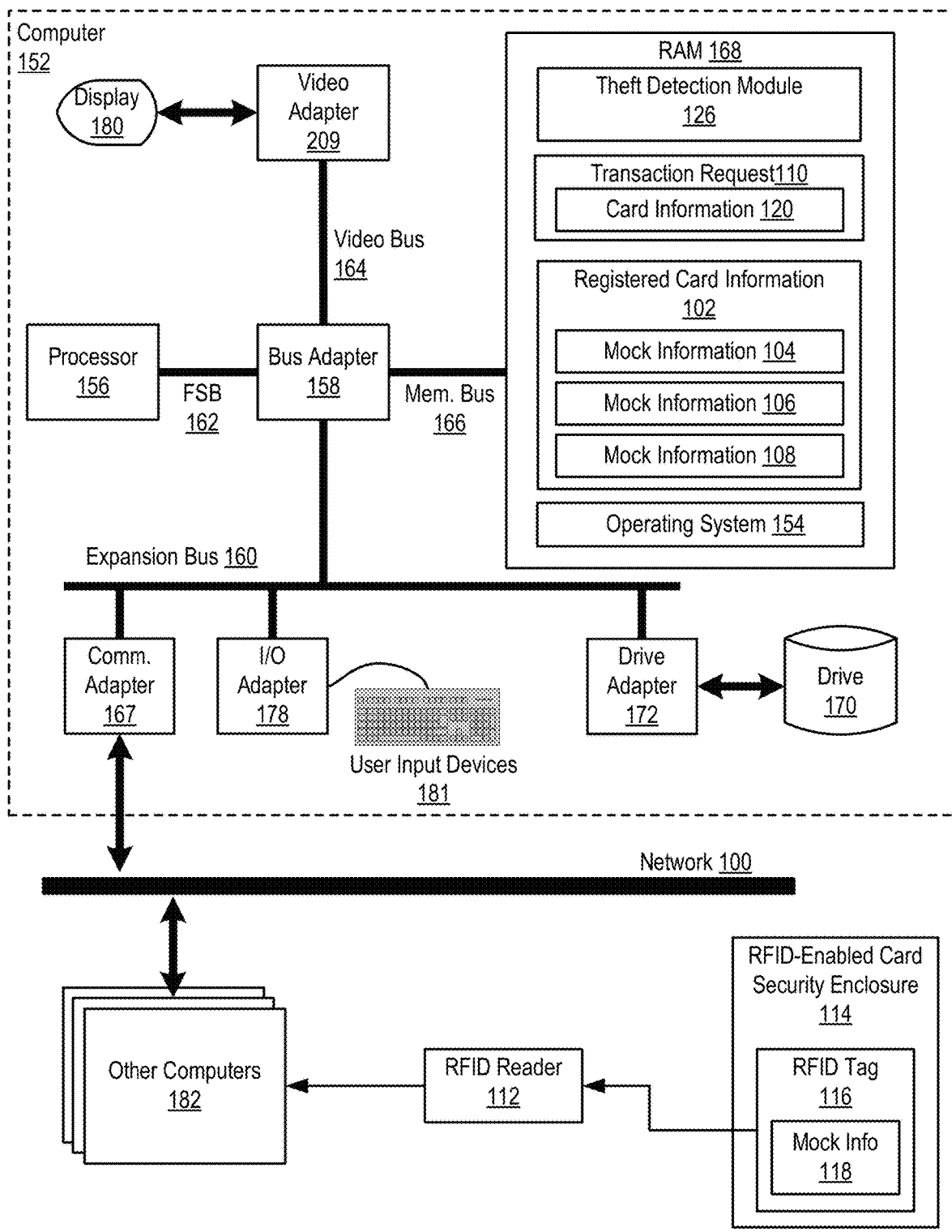
FIG. 1 sets forth a block diagram of a system configured for detecting an attempted theft of information stored in an RFID-enabled card according to embodiments of the present invention.

Exemplary methods, apparatus, and products for detecting an attempted theft of information stored in an RFID-enabled card in accordance with the present invention are described with reference to the accompanying drawings, beginning with FIG. 1. FIG. 1 sets forth a block diagram of a system configured for detecting an attempted theft of information stored in an RFID-enabled card according to embodiments of the present invention. The system of FIG. 1 includes an example of automated computing machinery in the form of a computer (152).

The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is a theft detection module (126), a module of computer program instructions for detecting an attempted theft of information stored in an RFID-enabled card. The theft detection module (126) may be configured to detect an attempted theft of information stored in an RFID-enabled card in accordance with embodiments of the present invention by: receiving a transaction request (110). The transaction request (110) includes RFID-enabled card information (120). Such a transaction request may be a request for a particular type of transaction corresponding to the type of the RFID-enabled card used to request the transaction. Consider, for example, that the RFID-enabled card is a credit card. In such an example, a transaction request may be a request to complete a purchase of an item at a physical retail establishment or through an online purchase. The RFID-enabled card information included in the transaction request may also be dependent upon a particular type of RFID-enabled card. Continuing with the example above of a credit card, the RFID-enabled card information included in the transaction request may be in the form of a credit card number or other identification of credit card. Here, the RFID-enabled card information is said to be "in the form of" an identifier of a type of RFID-enabled card, because as explained below, the information itself may be mock information. That is, the information may be fake. In the example of a credit card transaction request then, the RFID-enabled card information of the transaction request may be in the form of a credit card number, but may not actually be a valid number.

To that end, the theft detection module (126) may also determine whether the RFID-enabled card information is mock card information. The theft detection module (126) in the example of FIG. 1 may access a database of registered card information (102). Such a database may include valid card information as well as mock information (104, 106, 108). Such mock information may be registered by a user or manufacturer of an RFID-enabled card security enclosure implemented according to embodiments of the present invention.

Such an RFID-enabled card security enclosure may include an RFID shield where the RFID shield is configured to block RFID transmissions from an exterior of the RFID shield into an interior space formed by the RFID shield. Such a shield may be implemented as a Faraday cage or other similar transmission blocking layer. The interior space of the RFID-enabled card security enclosure is configured to store one or more RFID-enabled cards.

The RFID-enabled card security enclosure (114) in the example of FIG. 1 also includes an RFID tag (116) which is located exterior to the RFID shield—that is, the RFID tag is not shielded from RF transmissions. The RFID tag (116) may store mock card information (118).

When a user, with an RFID reader (112) attempts to steal valid RFID-enabled card information from the RFID-enabled card security enclosure (114), the shield will secure all card on the interior of the enclosure from the RF transmissions. The RFID tag (116), however, being exposed to RF transmissions, will return the mock RFID information (118) to the RFID reader (112). In this way, a user that attempts to steal RFID-enabled card information believes, incorrectly, that the theft attempt was successful after receiving information from the card enclosure that appears to be valid card information. Unbeknownst to the user, however, the card information is not valid, but is mock information. When such a user attempts to perform a transaction using that retrieved card information, the theft detection module (126) compares the card information to the database of registered card information to determine whether the received card information is valid or, instead, mock information.

Responsive to determining that the RFID-enabled card information is mock card information, the theft detection module (126) in the example of FIG. 1 may initiate one or more security actions. Such security action will be described below in greater detail, but generally include notifying the owner of the security enclosure of the attempted theft, notifying police or other authorities of the attempted theft, capturing a physical location of the initiation of the transaction request, capturing an IP address of the computer upon which the transaction request was initiated, capturing an address from the transaction request, denying the transaction request, and so on as will occur to readers of skill in the art.

Also stored in RAM (168) is an operating system (154). Operating systems useful in computers configured for detecting an attempted theft of information stored in an RFID-enabled card according to embodiments of the present invention include UNIX™, Linux™, Microsoft Windows™, AIX™, IBM's iOS™, and others as will occur to those of skill in the art. The operating system (154), theft detection module (126), transaction request (110), and registered card information (102), in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for detecting an attempted theft of information stored in an RFID-enabled card according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for detecting an attempted theft of information stored in an RFID-enabled card according to embodiments of the present invention include modems for wired dial-up communications, Ethernet (IEEE 802.3) adapters for wired data communications, and 802.11 adapters for wireless data communications.

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
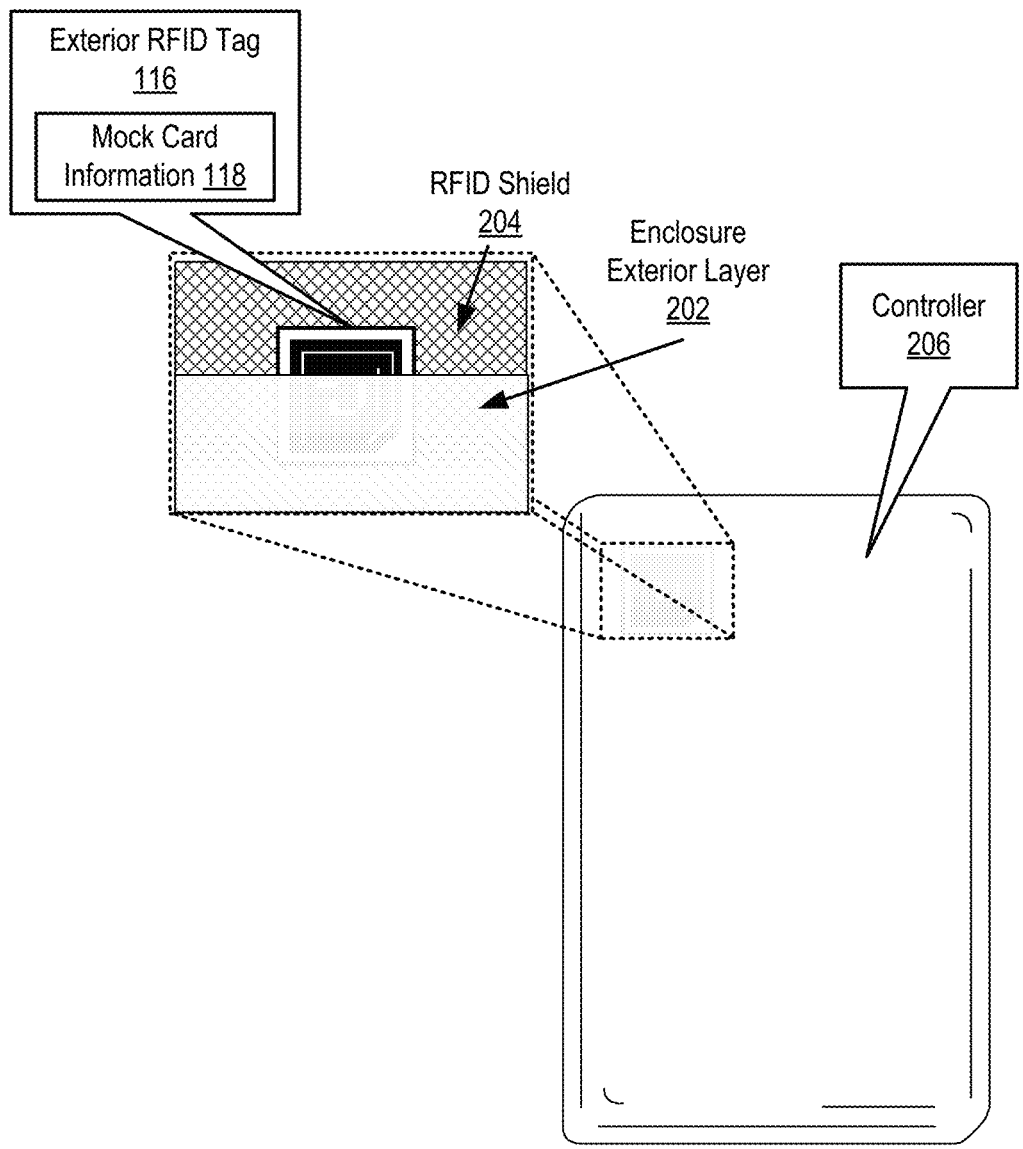
FIG. 2 sets forth a line drawing of an exterior of an example RFID-enabled security enclosure configured according to embodiments of the present invention.

For further explanation, FIG. 2 sets forth a line drawing of an exterior of an example RFID-enabled security enclosure configured according to embodiments of the present invention. The example RFID-enabled card security enclosure (114) of FIG. 2 includes several layers. Beginning with the outermost exterior layer and moving in, the outermost exterior layer (202) of the enclosure (114) may be composed of a material through which RFID transmission may pass. That is, the outermost exterior layer is not an RFID shield.

In the example enclosure (114) of FIG. 2, between the outermost exterior layer (202) and an RFID shield (204) layer, is an exterior RFID tag (116). The exterior RFID tag (116) in the example enclosure (114) of FIG. 2, may store mock card information (118). Mock card information, as described above, is invalid identifying information in the form of card identification information. Being behind a non-shield material, the exterior RFID tag (116) may be exposed to RF transmitted from the exterior of the enclosure (114) and directed toward the interior of the enclosure (114). An RFID reader, for example, that transmits an RF interrogation signal toward the enclosure will activate the passive RFID tag, and receive from the activated RFID tag, the mock card information (118).

Such an RFID reader, however, will not receive any other valid card information from the enclosure due to presence of an RFID shield (204). The RFID shield (204) may block transmission of any RF signals from entering the interior of the enclosure (114). The RFID shield (204) in the example of FIG. 2 may be implemented as a conductive metal mesh or other material formed into a layer between the outermost exterior layer (202) and the interior of the enclosure (114).

In some embodiments, the RFID-enabled card security enclosure (114) may include a controller (206) operably coupled to the mock card information. In such an embodiment, the RFID-enabled card security enclosure (114) may include a power source, such a battery, to provide power to the controller (206). The controller (206) may be configured to dynamically modify the mock RFID information (118) stored in the exterior RFID tag. Such a dynamic modification may be carried out in a periodic manner. That is, the controller (206) may be configured to update the mock card information once an hour, once a day, once a week or so on. The controller may, for example, increment a numeric value of the mock card information based on a continuous counter or based on a timestamp. In this way, the mock card information received by a theft detection module may provide additional information, such as a time period within which the attempted theft occurred.

Figure 3:
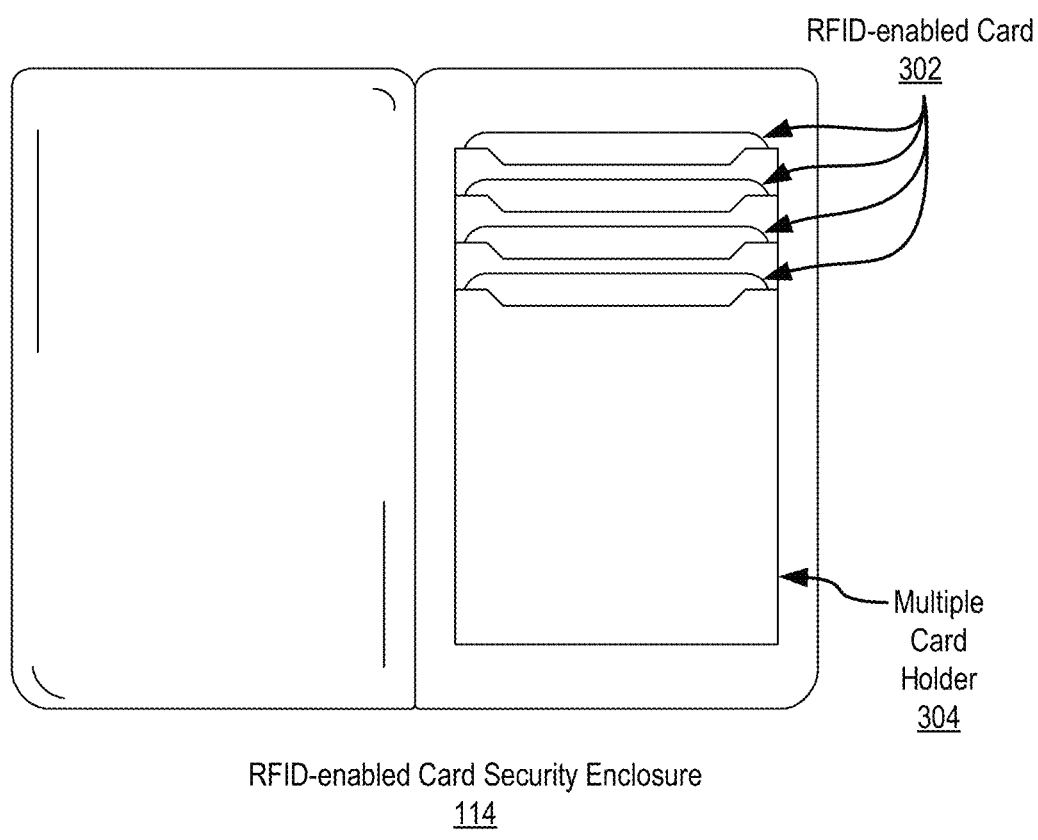
FIG. 3 sets forth a line drawing of an interior of an example RFID-enabled security enclosure configured according to embodiments of the present invention.

For further explanation, FIG. 3 sets forth a line drawing of an interior of an example RFID-enabled security enclosure configured according to embodiments of the present invention. The example RFID-enabled card security enclosure (114) of FIG. 3 is similar to the enclosure of FIG. 2 in that the enclosure (114) of FIG. 3 includes the same exterior layers (the RFID shield and the outermost layer that is not a shield) and the exterior RFID tag that includes mock card information. The example of FIG. 3 depicts a card holder (304) configured to store multiple cards. In the example of FIG. 3, the card holder (304) stores four RFID-enabled cards (302). Each of the cards (302) is secure from RF transmissions when the enclosure is closed and the RFID shield layer surrounds the cards.

Readers of skill in the art will recognize that an RFID-enabled card security enclosure may be implemented in a variety of manners. For example, the enclosure may be implemented as a wallet, as a pocket of a purse, briefcase, or computer case, or in many different other manners.

Figure 4:
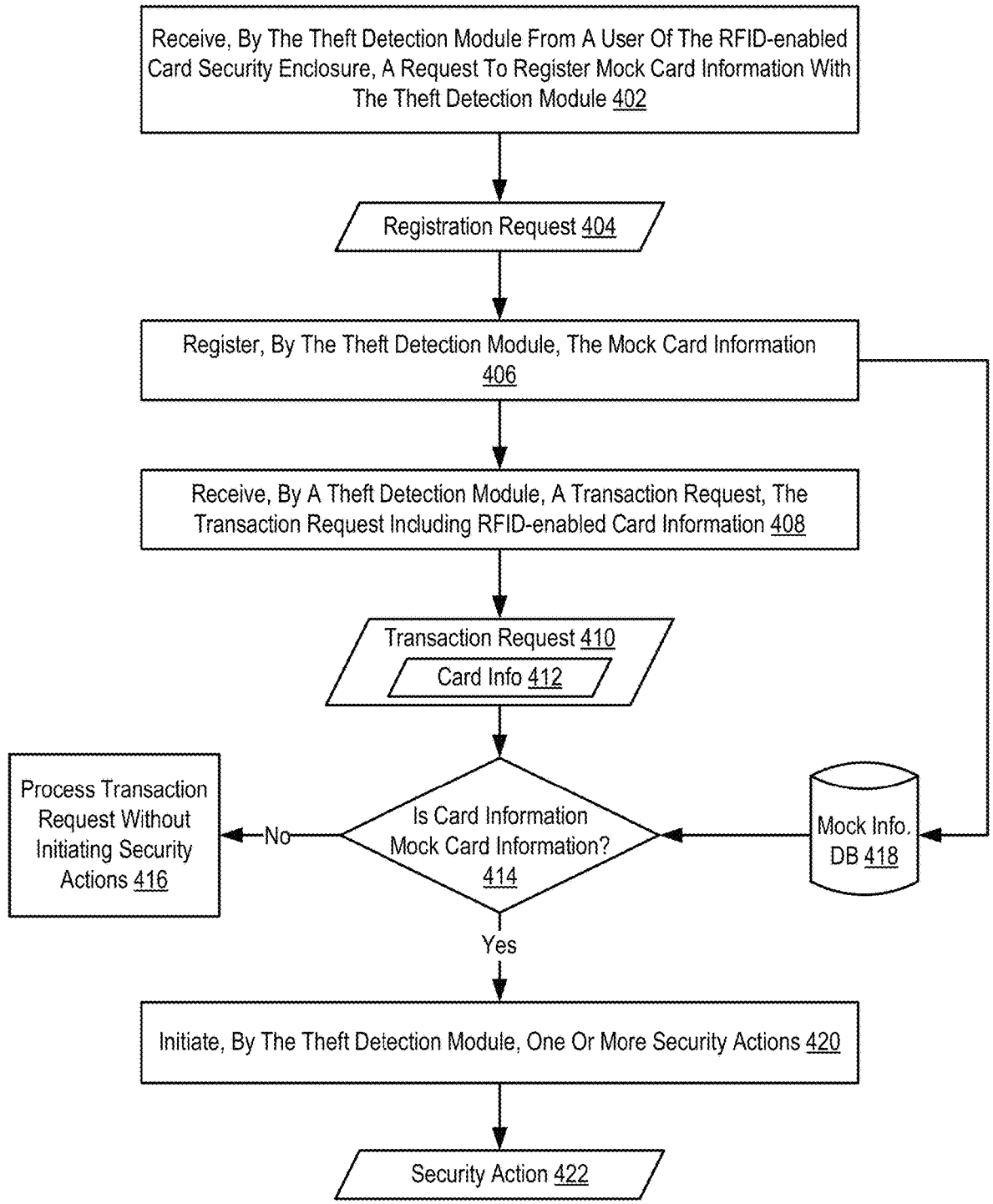
FIG. 4 sets forth a flow chart illustrating an example method of detecting an attempted theft of information stored in an RFID-enabled card according to embodiments of the present invention.

For further explanation, FIG. 4 sets forth a flow chart illustrating an example method of detecting an attempted theft of information stored in an RFID-enabled card according to embodiments of the present invention. In the example of FIG. 4, a user has possession of an RFID-enabled security enclosure configured according to embodiments of the present invention. Such an RFID-enabled security enclosure may include: an RFID shield configured to block RFID transmissions from an exterior of the RFID shield into an interior space formed by the RFID shield, where the interior space is configured to store one or more RFID-enabled cards. The security enclosure may also include an RFID tag located exterior to the RFID shield, where the RFID tag stores mock card information.

The method of FIG. 4 includes receiving (402), by a theft detection module from a user of the RFID-enabled card security enclosure, a request (404) to register mock card information with the theft detection module. The theft detection module may provide user's of security enclosures with an interface, such as an online portal, through which the user may register the mock card information of the security enclosure. In some cases, the request (404) to register mock card information may include the mock card information itself, secured or unsecured, and in some cases, the request to register mock card information may include an identifier of the enclosure. When the theft detection module receives an identifier of the enclosure, the theft detection module may request the mock card information from the manufacturer of the security enclosure using the identifier of the enclosure received from the user.

The method of FIG. 4 also includes registering (406), by the theft detection module, the mock card information. In some embodiments, registering (406) the mock card information may include storing the mock card information in a database (418). Such a database may be accessible by multiple theft detection modules. For example, there may be a single mock card information database, one theft detection module that operates to register mock card information, and many theft detection modules that access the mock card information database (418) to determine whether a particular access request includes mock or valid card information.

The method of FIG. 4 also includes receiving (408), by the theft detection module, a transaction request (410). In the method of FIG. 4, the transaction request (410) includes RFID-enabled card information (412). The term 'RFID-enabled card information' as used here refers to data in the form of information stored on an RFID-enabled card and accessible by RF signals. The data itself may be actual, valid information, or may be mock card information.

Receiving (408) such a transaction request (410) may be carried out in a variety of ways. In some embodiments, for example, the card information may be in the form of credit card information and receiving a transaction request (410) may be carried out by receiving a request to authorize a credit card purchase. That is, the transaction request may be a request to perform a purchase utilizing the RFID-enabled security card information for authorization of the purchase. Such a purchase may be an in-person purchase, where a user of a card is physically present at a point-of-sale. Such a purchase may also be an online purchase. In some embodiments, receiving (408) a transaction request (410) may include receiving a request to grant access to a secure location. For example, an RFID-enabled card may be implemented as a security key card utilized to unlock a door lock, a vault, or other secure location. In yet other examples, the RFID-enabled security card information may be in the form of user identification information from a passport, a driver's license, or other identification. To that end, the transaction request may be a request for user authentication. Such a request may be initiated in an attempt to purchase age-restricted materials (chemicals, prescription medicine, and the like).

The method of FIG. 4 also includes determining (414), by the theft detection module, whether the RFID-enabled card information (412) received in the transaction request (410) is mock card information. In the method of FIG. 4, determining whether the RFID-enabled card information (412) received in the transaction request (410) is mock card information may be carried out by comparing the RFID-enabled card information (412) to the card information registered in the mock card information database (418). If the theft detection module identifies registered mock card information that matches the RFID-enabled card information (412), the theft detection module determines that the RFID-enabled card information (412) is mock card information.

If the RFID-enabled is not mock card information, the method of FIG. 4 continues by processing (416) the transactions request without initiating any security actions. By contrast, if the theft detection module determines that the RFID-enabled card information (412) included in the transaction request (410) is mock card information, the method of FIG. 4 continues by initiating (420), by the theft detection module, one or more security actions (422). The term "security actions" as used here refers to any action that may aid in identifying, locating, or capturing a user that initiated the transaction request (410). Initiating (420) one or more security actions may also include denying the transaction request.

Figure 5:
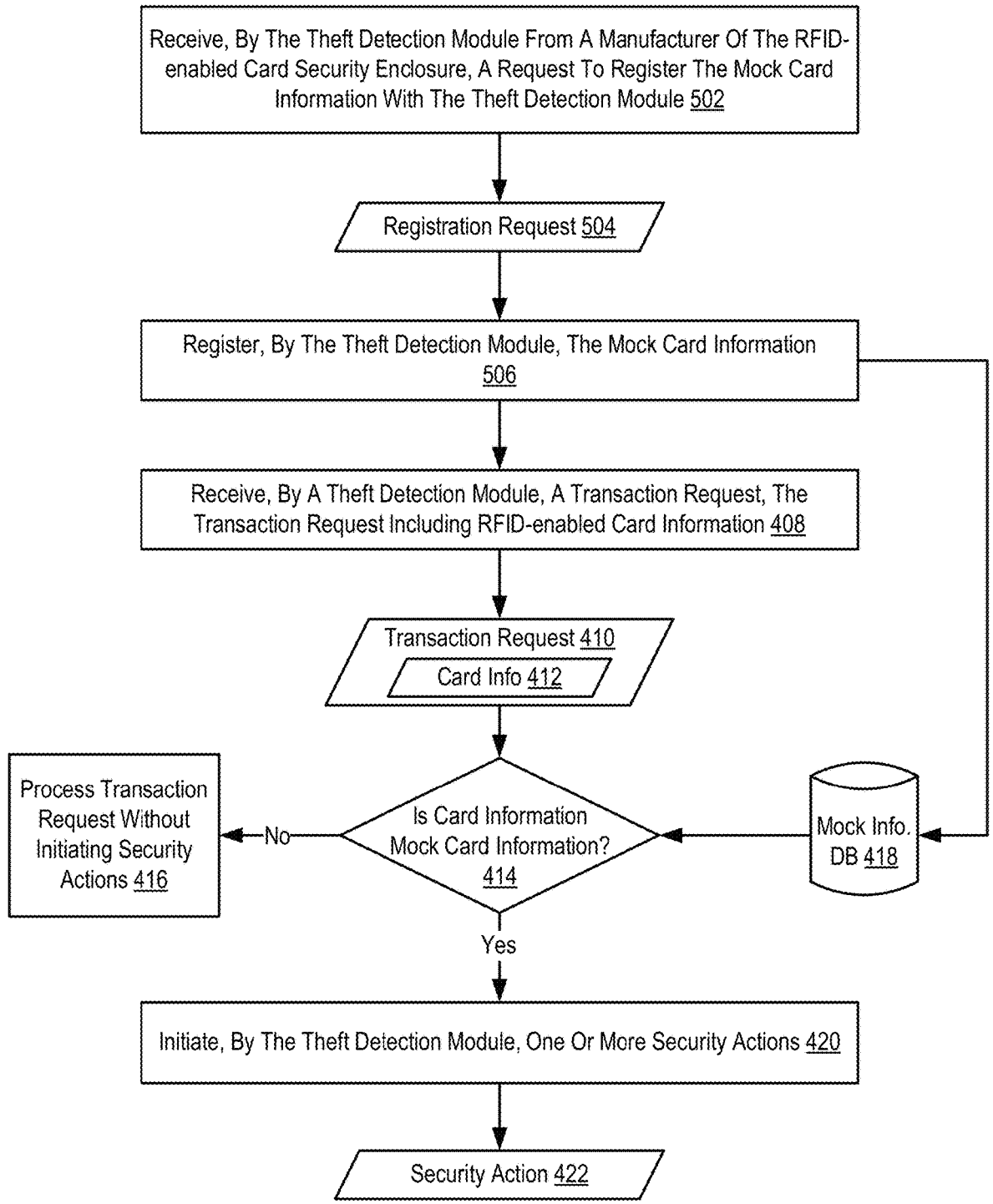
FIG. 5 sets forth a flow chart illustrating another example of detecting an attempted theft of information stored in an RFID-enabled card according to embodiments of the present invention.

For further explanation, FIG. 5 sets forth a flow chart illustrating another example of detecting an attempted theft of information stored in an RFID-enabled card according to embodiments of the present invention. The method of FIG. 5 is similar to the method of FIG. 4 in that, in the example of FIG. 5, a user has possession of an RFID-enabled security enclosure configured according to embodiments of the present invention, and the method of FIG. 5 also includes: receiving (408), by a theft detection module, a transaction request, the transaction request including RFID-enabled card information; determining (414), by the theft detection module, that the RFID-enabled card information is mock card information; and responsive to determining that the RFID-enabled card information is mock card information, initiating (420), by the theft detection module, one or more security actions.

The method of FIG. 5 differs from the method of FIG. 4, however, in that, rather than a user registering the mock card information stored in the RFID tag external to the RF shield of the security enclosure, a manufacturer of the card performs the registration. To that end, the method of FIG. 5 includes receiving (502), by the theft detection module from a manufacturer of the RFID-enabled card security enclosure, a request (504) to register the mock card information with the theft detection module and registering (506), by the theft detection module, the mock card information. As the manufacturer stores, during manufacturing, the mock card information in the RFID tag of the security enclosure, the manufacturer may register the mock card information. Such registration may occur prior to the security enclosure being placed on sale or being utilized by any user. That is, in the example of FIG. 5, an end user need not take any actions (such as registration) to secure RFID-enabled cards and detect theft attempts of RFID-enabled card information, other than utilizing the security enclosure.

Figure 6:
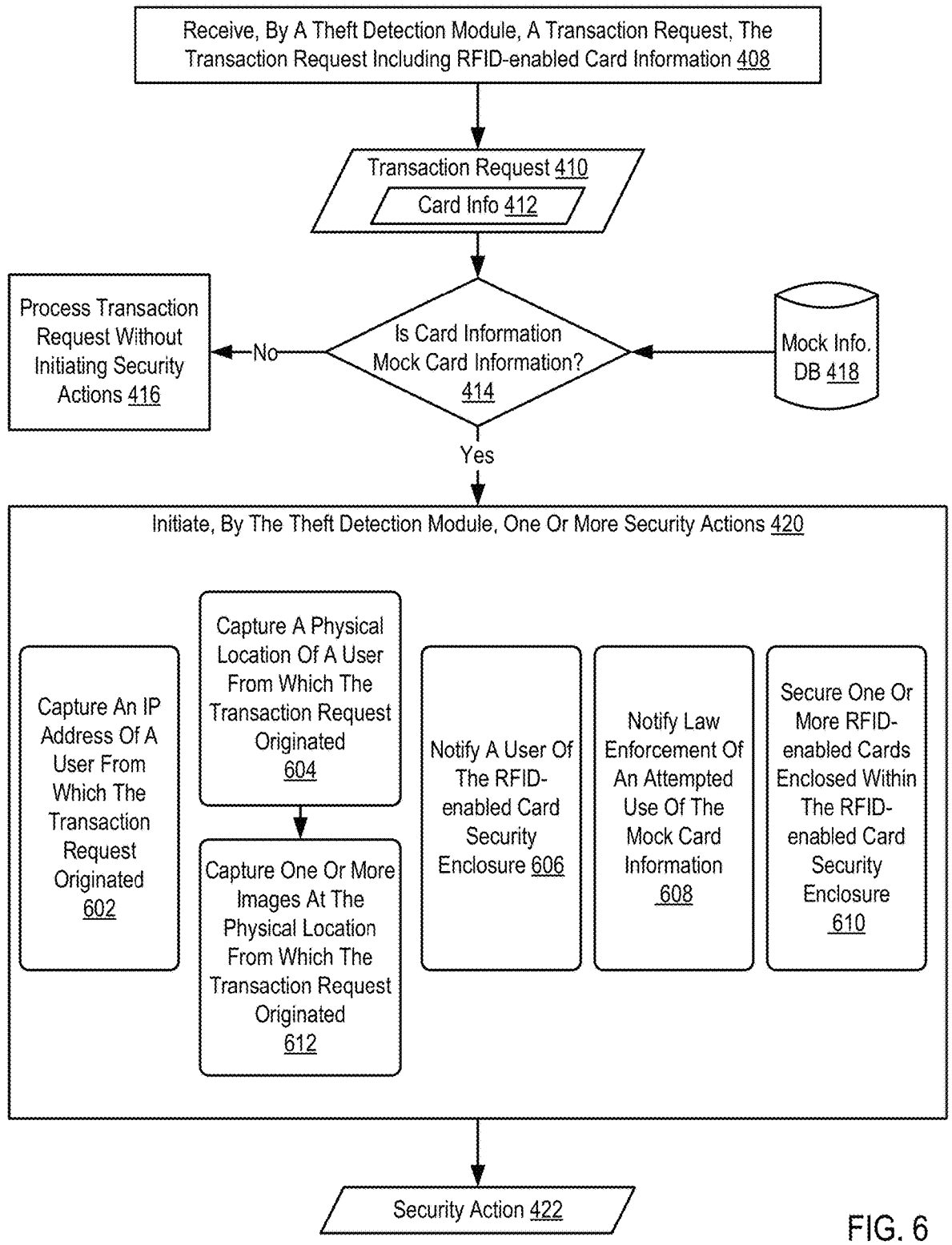
FIG. 6 sets forth a flow chart illustrating another example of detecting an attempted theft of information stored in an RFID-enabled card according to embodiments of the present invention.

For further explanation, FIG. 6 sets forth a flow chart illustrating another example of detecting an attempted theft of information stored in an RFID-enabled card according to embodiments of the present invention. The method of FIG. 6 is similar to the method of FIG. 4 in that, in the example of FIG. 6, a user has possession of an RFID-enabled security enclosure configured according to embodiments of the present invention, and the method of FIG. 6 also includes: receiving (408), by a theft detection module, a transaction request, the transaction request including RFID-enabled card information; determining (414), by the theft detection module, that the RFID-enabled card information is mock card information; and responsive to determining that the RFID-enabled card information is mock card information, initiating (420), by the theft detection module, one or more security actions.

The method of FIG. 6 differs from the method of FIG. 4, however, in that FIG. 6 sets forth several examples of security actions that may be initiated (420) responsive to the theft detection module determining that the RFID-enabled card information (412) received in the transaction request (410) is mock card information.

In some embodiments, a user that collects the mock card information stored in the RFID tag of the security enclosure may utilize that mock card information to make purchases online, without creating a physical medium in which to re-store the mock card information. In other embodiments, the user that collects the mock card information may store the information in a RFID tag of an actual, physical card so that the user may utilize the card at physical locations. Such utilization at a physical location may include making a purchase at a retail establishments by swiping, tapping, or scanning the physical card, pressing the physical card against a card reader at a secure location for the purposes of gaining access to the secure location (by unlocking a door, for example), and so on as will occur to readers of the skill in the art.

To that end, in embodiments in which the transaction request (410) is an online purchase transaction request (a request to authorize a purchase through an online commerce portal), initiating (420) one or more security actions in the method of FIG. 6 includes capturing (602) an IP ('Internet Protocol') address of a user from which the transaction request originated. Such an IP address may be utilized to identify the location at which the transaction request originated.

In embodiments in which the transaction request (410) originated from a transaction initiated with a physical card, initiating (420) one or more security actions in the method of FIG. 6 includes, capturing (604) a physical location of a user from which the transaction request originated. Capturing such a physical location may be carried out by inspecting the transaction request for such a physical location, by requesting the physical location as a response to the transaction request, and so on as will occur to readers of skill in the art. Examples of such physical locations may be a location within a building, a particular security door, a particular vault identifier, a particular retail or commercial establishment identification, a payment location of a particular speed-pass location, and so on as will occur to readers of skill in the art.

In addition to capturing (604) the physical location, the method of FIG. 6 also includes capturing (612) one or more images at the physical location from which the transaction request originated. The term 'one or more images' as used here refers to either images or video (a serial stream of images). In this way, it may be possible not only to identify the location of the user in possession of the mock card information but also capture a photograph, digital image, or video of the user attempting to use the mock card information.

Once the location, whether physical or the IP address of the originator of the transaction request, is captured, the theft detection module may provide the location to law enforcement along with a details and a description of the attempted transaction.

In the method of FIG. 6, initiating (420) one or more security actions may also include notifying (606) a user of the RFID-enabled card security enclosure and notifying (608) law enforcement of an attempted use of the mock card information. Notifying (606) the user may be carried out by sending a communication through a communication means indicated by the user when the user registered the mock card information, or in other ways as will occur to readers of skill in the art. Notifying (608) law enforcement may be carried out through email, through automated voice call, or through a communications means created and maintained for just such a purpose. That is, law enforcement may provide a web service, or other dedicated communications channel, through which the theft detection module may provide theft attempt notifications.

In the method of FIG. 6, initiating (420) one or more security actions may also include securing (610) one or more RFID-enabled cards enclosed within the RFID-enabled card security enclosure. That is, in some embodiments, a user of such a security enclosure may, in addition to registering the mock card information, also register any RFID-enabled cards which may be used in the enclosure. In this way, when an attempted theft is discovered through the mock card information, the registered RFID-enabled cards may be secured—by cancellation or account suspension—in an abundance of caution.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of detecting an attempted theft of information stored in a Radio Frequency Identification ('RFID')-enabled card, the method comprising,
by computer program instructions executed by a computer processor:
receiving, by a theft detection module, a transaction request, the transaction request including RFID-enabled card information;
determining, by the theft detection module, that the RFID-enabled card information is mock card information corresponding to an RFID-enabled card security enclosure that is not valid RFID-enabled card information for an RFID-enabled card contained inside an RFID shield of the RFID-enabled card security enclosure, wherein the mock card information is modified at regular intervals to include updated information that is based on a timestamp, wherein the mock card information is provided to an RFID reader by an RFID tag disposed between an exterior of the security enclosure and the RFID shield responsive to an RFID request directed at the security enclosure, wherein the mock card information provided to the RFID reader responsive to the RFID request directed at the security enclosure includes updated timestamp information corresponding to a time period of an attempted theft of the RFID-enabled card information; and
responsive to determining that the RFID-enabled card information is mock card information, initiating, by the theft detection module, one or more security actions.

2. The method of claim 1 wherein:
receiving, by the theft detection module from a user of the RFID-enabled card security enclosure, a request to register the mock card information with the theft detection module; and
registering, by the theft detection module, the mock card information.

3. The method of claim 1 further comprising:
receiving, by the theft detection module from a manufacturer of the RFID-enabled card security enclosure, a request to register the mock card information with the theft detection module; and
registering, by the theft detection module, the mock card information.

4. The method of claim 1 further comprising:
the mock card information comprises mock credit card information; and
the transaction request comprises a request to perform a purchase using the mock credit card information.

5. The method of claim 1 wherein:
the mock card information comprises mock security card information; and
the transaction request comprises a request for access to a secured object.

6. The method of claim 1 wherein:
the mock card information comprises mock user identification information; and
the transaction request comprises a request for user authentication.

7. The method of claim 1, wherein:
the transaction request comprises an online transaction request; and
the security actions further comprise capturing an IP ('Internet Protocol') address of a user from which the transaction request originated.

8. The method of claim 1, wherein:
the transaction request originated from a transaction initiated with a physical card; and
the security actions include capturing a physical location of a user from which the transaction request originated.

9. The method of claim 8, wherein the security action further includes:
capturing one or more images at the physical location from which the transaction request originated.

10. The method of claim 1, wherein the security actions further comprise notifying a user of the RFID-enabled card security enclosure.

11. The method of claim 1, wherein the security actions further comprise notifying law enforcement of an attempted use of the mock card information.

12. The method of claim 1, wherein the security actions further comprise securing one or more RFID-enabled cards enclosed within the RFID-enabled card security enclosure.

13. An apparatus for detecting an attempted theft of information stored in a Radio Frequency Identification ('RFID')-enabled card, the apparatus comprising a computer processor, a computer memory operatively coupled to the computer processor, the computer memory having disposed within it computer program instructions that, when executed by the computer processor, cause the apparatus to carry out the steps of:
receiving, by a theft detection module, a transaction request, the transaction request including RFID-enabled card information;
determining, by the theft detection module, that the RFID-enabled card information is mock card information corresponding to an RFID-enabled card security enclosure that is not valid RFID-enabled card information for an RFID-enabled card contained inside an RFID shield of the RFID-enabled card security enclosure, wherein the mock card information is modified at regular intervals to include updated information that is based on a timestamp, wherein the mock card information is provided to an RFID reader by an RFID tag disposed between an exterior of the security enclosure and the RFID shield responsive to an RFID request directed at the security enclosure, wherein the mock card information provided to the RFID reader responsive to the RFID request directed at the security enclosure includes updated timestamp information corresponding to a time period of an attempted theft of the RFID-enabled card information; and responsive to determining that the RFID-enabled card information is mock card information, initiating, by the theft detection module, one or more security actions.

14. The apparatus of claim 13 further comprising computer program instructions that, when executed by the computer processor, cause the apparatus to carry out the steps of:

receiving, by the theft detection module from a user of the RFID-enabled card security enclosure, a request to register the mock card information with the theft detection module; and registering, by the theft detection module, the mock card information.

15. The apparatus of claim 13 further comprising computer program instructions that, when executed by the computer processor, cause the apparatus to carry out the steps of:

receiving, by the theft detection module from a manufacturer of the RFID-enabled card security enclosure, a request to register the mock card information with the theft detection module; and registering, by the theft detection module, the mock card information.

16. The apparatus of claim 13 wherein:

the mock card information comprises mock credit card information; and the transaction request comprises a request to perform a purchase using the mock credit card information.

17. The apparatus of claim 13 wherein:

the mock card information comprises mock security card information; and the transaction request comprises a request for access to a secured object.

18. The apparatus of claim 13 wherein:

the mock card information comprises mock user identification information; and the transaction request comprises a request for user authentication.

* * * * *